United States Patent
Libin et al.

(10) Patent No.: US 11,714,595 B1
(45) Date of Patent: Aug. 1, 2023

(54) ADAPTIVE AUDIO FOR IMMERSIVE INDIVIDUAL CONFERENCE SPACES

(71) Applicant: mmhmm inc., Little Rock, AR (US)

(72) Inventors: Phil Libin, San Francisco, CA (US); Leonid Kitainik, San Jose, CA (US)

(73) Assignee: mmhmm inc., Little Rock, AR (US)

( * ) Notice: Subject to any disclaimer, the term of this patent is extended or adjusted under 35 U.S.C. 154(b) by 207 days.

(21) Appl. No.: 17/359,227

(22) Filed: Jun. 25, 2021

Related U.S. Application Data

(60) Provisional application No. 63/062,504, filed on Aug. 7, 2020.

(51) Int. Cl.
| | |
|---|---|
| *G10L 15/26* | (2006.01) |
| *G06F 3/16* | (2006.01) |
| *G10L 15/22* | (2006.01) |
| *H04R 3/00* | (2006.01) |
| *H04S 7/00* | (2006.01) |

(Continued)

(52) U.S. Cl.
CPC ............ *G06F 3/165* (2013.01); *G06V 40/174* (2022.01); *G06V 40/20* (2022.01); *G10L 15/22* (2013.01); *G10L 15/26* (2013.01); *H04N 7/15* (2013.01); *H04R 3/005* (2013.01); *H04S 7/302* (2013.01); *H04S 7/305* (2013.01); *G10L 2015/223* (2013.01)

(58) Field of Classification Search
CPC ...... G06F 3/04845; G06F 3/165; G06F 3/167; G06V 40/161; G06V 40/174; G06V 40/20; G06V 40/176; G10L 15/22; G10L 15/26; G10L 2015/223; G10L 21/00; G11B 27/031; H04L 12/1895; H04L 65/4038; H04L 65/80; H04M 3/567; H04N 7/147; H04N 7/15; H04N 21/43637; H04N 21/4394; H04N 21/44218; H04N 7/157; H04R 3/005; H04S 5/005; H04S 7/302; H04S 7/303; H04S 7/305; A61B 5/165; G06Q 10/10
See application file for complete search history.

(56) References Cited

U.S. PATENT DOCUMENTS

| | | | |
|---|---|---|---|
| 10,261,749 B1 * | 4/2019 | Wilcox | .............. G06F 3/04845 |
| 10,276,175 B1 * | 4/2019 | Garcia | .................... G10L 15/22 |

(Continued)

*Primary Examiner* — Gerald Gauthier
(74) *Attorney, Agent, or Firm* — Muirhead and Saturnelli, LLC

(57) ABSTRACT

Adapting an audio portion of a video conference includes a presenter providing content for the video conference by delivering live content, prerecorded content, or combining live content with prerecorded content, at least one additional co-presenter provides content for the video conference, and untangling overlapping audio streams of the presenter and the co-presenter by replaying individual audio streams from the presenter and/or the at least one co-presenter or separating the audio streams by diarization. Adapting an audio portion of a video conference may also include recording the presenter to provide a recorded audio stream, using speech-to-text conversion to convert the recorded audio stream to text, correlating the text to the recorded audio stream, retrieving a past portion of the recorded audio stream using a keyword search of the text, and replaying the past portion of the recorded audio stream. The keyword may be entered using a voice recognition system.

12 Claims, 12 Drawing Sheets

(51) Int. Cl.
*H04N 7/15* (2006.01)
*G06V 40/20* (2022.01)
*G06V 40/16* (2022.01)

(56) References Cited

U.S. PATENT DOCUMENTS

| | | | | |
|---|---|---|---|---|
| 10,356,362 | B1* | 7/2019 | Rudberg | H04N 7/147 |
| 10,788,890 | B1* | 9/2020 | Watson | A61B 5/165 |
| 11,082,465 | B1* | 8/2021 | Chavez | H04L 65/4038 |
| 11,317,060 | B1* | 4/2022 | Libin | H04N 7/157 |
| 11,461,952 | B1* | 10/2022 | Bosnak | G10L 15/22 |
| 11,501,794 | B1* | 11/2022 | Kim | G06V 40/161 |
| 11,604,623 | B2* | 3/2023 | Desai | H04M 1/72454 |
| 2003/0008627 | A1* | 1/2003 | Efron | G11B 27/031 |
| | | | | 455/142 |
| 2009/0234921 | A1* | 9/2009 | Dudley | G06Q 10/10 |
| | | | | 709/204 |
| 2012/0281057 | A1* | 11/2012 | Couse | H04M 3/567 |
| | | | | 348/14.03 |
| 2014/0320588 | A1* | 10/2014 | Midtun | H04L 12/1895 |
| | | | | 370/260 |
| 2015/0127340 | A1* | 5/2015 | Epshteyn | G10L 21/00 |
| | | | | 704/235 |
| 2017/0118597 | A1* | 4/2017 | Swirsky | G06F 3/165 |
| 2017/0353811 | A1* | 12/2017 | McGibney | H04S 7/303 |
| 2020/0106708 | A1* | 4/2020 | Sleevi | H04L 65/80 |
| 2021/0120356 | A1* | 4/2021 | Elby | H04S 5/005 |
| 2021/0120358 | A1* | 4/2021 | Elby | H04S 7/303 |
| 2021/0247953 | A1* | 8/2021 | Brooks | H04N 21/43637 |
| 2021/0274261 | A1* | 9/2021 | Sato | H04N 21/4394 |
| 2021/0334066 | A1* | 10/2021 | Pance | H04N 21/44218 |
| 2022/0357801 | A1* | 11/2022 | Udall | G06V 40/20 |

* cited by examiner

ADAPTIVE AUDIO FOR IMMERSIVE INDIVIDUAL CONFERENCE SPACES

CROSS-REFERENCE TO RELATED APPLICATIONS

This application claims priority to U.S. Prov. App. No. 63/062,504, filed on Aug. 7, 2020, and entitled "ADAPTIVE AUDIO FOR IMMERSIVE INDIVIDUAL CONFERENCE SPACES WITH SHARED VIRTUAL CHANNELS", which is incorporated herein by reference.

TECHNICAL FIELD

This application is directed to the field of audio-video conferencing and presentation of information, and more particularly to the field of supplying adaptive audio capabilities for individual audio-video conferencing spaces with shared virtual channels and immersive users.

BACKGROUND OF THE INVENTION

Video conferencing has grown into a pervasive communication method. Efficient visual communications between project participants have become a primary productivity factor due to increasing globalization and mobilization of workforce with emphasis on distributed product execution and continuous coordination between participating teams and individual contributors.

Numerous collaboration systems and tools have been developed to facilitate various aspects of shared project work using video conferencing. In response to the COVID-19 pandemic, which required billions of people to stay at home for prolonged periods of time and seriously limited travel and other types of in-person communications, video conferencing has almost instantly become the most important productivity medium, connecting people through their work, personal, and family lives. Video conferencing has successfully replaced travel and physical contacts with virtual presence and collaboration.

According to recent market research, the size of global video conferencing market has reached $5.6 billion USD in 2019 and was recently predicted to grow to $10.5 billion by 2027; these projections will likely be dwarfed by the skyrocketing demand in efficient visual communications related to the COVID-19 pandemic and to associated long-term changes in team collaboration and productivity paradigms. On an average day, US businesses have video conferencing meetings with hundreds of millions of daily participants: Zoom alone has over 300 million daily participants of its video meetings; during the quarantine months of 2020, Google Hangout Meets had over 100 million daily participants, while Microsoft Teams had almost 75 million active daily users in 2020.

Recent polls have revealed important usage statistics for video conferencing: 94% of businesses who use video conferencing state that the company benefits from greater productivity; 51% of workers value video conferencing either more or equally as important than business chat applications for their daily work; 43% of workers using video conferencing in a team structure believe that it can enhance their productivity despite the remote working style; 75% of CEOs predict that video conferencing will replace regular conference calls; 54% of the US workforce frequently participates in video conferences; 78% of corporate businesses use video conferencing to facilitate team meetings; and 77.2% businesses use video conferencing to connect with remote employees.

The top six providers of video conferencing services, Zoom, GoToWebinar, Cisco Webex, ON24, GoToMeeting and Adobe Connect, jointly command over 82% of the market share. It was also estimated that, on average, 77% of participants of video conferences join from their notebook or desktop computers, which suggests that most participants have enough screen space for clear views of presenters, thumbnail videos of meeting participants, shared documents and presentations, etc.

Two interconnected trends in video conferencing caused by social and workforce effects of the pandemics require significant attention of technology and product vendors: more participants will join conference calls from individual conference spaces (homes, private studios, etc.) due to social distancing requirements and growing online-only presence of companies of all sizes; accordingly, the average number of participants of video conferences is expected to increase. New categories of videoconferencing products, such as mmhmm by mmhmm, inc., are offering immersive conferencing spaces where meeting participants may combine content presentation based on shared virtual channels with individual and shared visual presence, while joining meetings from individual conference spaces. Such immersive video conferencing spaces require new communication metaphors for all types of media.

Notwithstanding a significant progress in video conferencing products and services, multiple challenges remain. One demanding area of improvement is the audio component of conferencing products and services. Differences in audio equipment, software, bandwidth and compression technologies used by participants may cause low quality of calls, background noise, delays and distortions of individual voices causing speaker misidentification, cross talk and other issues. Recent market research has discovered that low audio quality of conference calls has become the top reason why people reject this communication method, with over 40% of meeting participants complaining about frequent audio issues. In addition, advanced capabilities of audio systems and associated expressive opportunities of such systems in video conferencing are greatly underused.

Accordingly, it is desirable to provide mechanisms for adaptive audio solutions, accompanying immersive experiences in video conferencing and enabling immersive conferencing spaces based on individual presentation rooms.

SUMMARY OF THE INVENTION

According to the system described herein, adapting an audio portion of a video conference includes prerecording a first fragment of a presenter providing content for the video conference, providing a second fragment of the video conference corresponding to the presenter delivering live content for the video conference, combining the first fragment with the second fragment to present a combined presentation to an audience of the video conference, and using different audio modes to facilitate differentiation between the fragments by the audience. Using different audio modes may include using monophonic sound for the first fragment and using stereophonic sound for the second fragment.

According further to the system described herein, adapting an audio portion of a video conference includes a presenter providing content for the video conference by delivering live content, prerecorded content, or combining live content with prerecorded content, detecting changing expressive and emotional states of the presenter, and superimposing audio markers on the audio portion of the video conference, wherein the audio markers correspond to a detected emotional state of the presenter. Detecting changing expressive and emotional states of the presenter may include using a facial recognition component, a gesture recognition component, a speech recognition component, and/or an expression/emotion recognition component where the recognition components may be applied to a visual appearance and an audio stream of the presenter. The audio markers may be growling, applauding, and/or brief verbal expressions. Adapting an audio portion of a video conference may include altering at least one of: pitch, timbre, and expression of audio content provided by the presenter.

According further to the system described herein, adapting an audio portion of a video conference includes a presenter providing content for the video conference by delivering live content, prerecorded content, or combining live content with prerecorded content, at least one additional co-presenter provides content for the video conference, and untangling overlapping audio streams of the presenter and the co-presenter by replaying individual audio streams from the presenter and/or the at least one co-presenter or separating the audio streams by diarization. Adapting an audio portion of a video conference may also include recording the presenter to provide a recorded audio stream, using speech-to-text conversion to convert the recorded audio stream to text, correlating the text to the recorded audio stream, retrieving a past portion of the recorded audio stream using a keyword search of the text, and replaying the past portion of the recorded audio stream. A corresponding video stream may be replayed along with the past portion of the audio stream. The keyword may be entered using a voice recognition system. Adapting an audio portion of a video conference may also include eliminating background noise by applying filters thereto and generating background sounds as a productivity and attention booster. Background sounds may be based on audience reaction and/or presentation specifics. Adapting an audio portion of a video conference may also include emulating audience feedback. Emulating audience feedback may include providing sounds corresponding to a laugh, a sigh, applause, happy exclamations, and/or angry exclamations. Emulated audience feedback may be controlled by a facial recognition component, a gesture recognition component, a speech recognition component, and/or an expression/emotion recognition component and where the recognition components are applied to a visual appearance and an audio stream of the presenter. Audience feedback may be acoustically and visually enhanced by changing spatial acoustic properties to emulate acoustic properties of a larger conference room or hall and by zooming out a scene to show the presenter and participants in a virtual conference room, a hall or other shared space using special video features. Adapting an audio portion of a video conference may also include altering acoustic properties of the audio portion according to a number of participants in the video conference and/or characteristics of a presentation space being emulated for the video conference. Altering acoustic properties may include varying echo and reverberation levels and intensities. Adapting an audio portion of a video conference may also include altering pitch, timbre, and/or expression of the audio streams provided by the presenter and/or the co-presenter.

According further to the system described herein, adapting an audio portion of a video conference includes a presenter providing content for the video conference by delivering live content, prerecorded content, or combining live content with prerecorded content and actuating audience microphones to select one of three modes: a first mode where sound from a corresponding audience member is broadcast in real time to all participants of the video conference, a second mode where each of the audience microphones is muted, and a third mode where audio tracks from the audience microphones are captured and broadcast at opportune periods of time. The audio tracks may not be broadcast to participants of the video conference while the audio tracks are being captured. When the audience microphones are in the third mode, the audio tracks may be captured at a particular one of the audience microphones in response to a corresponding one of the audience members providing a verbal command or actuating a control. When the audience microphones are in the third mode, the audio tracks may be captured at a particular one of the audience microphones in response to the presenter providing a verbal command or actuating a control. Captured, pre-processed, mixed and broadcast audio tracks from the audience microphones may represent audience feedback. Audience feedback may be acoustically and visually enhanced by changing spatial acoustic properties to emulate acoustic properties of a larger conference room or hall and by zooming out a scene to show the presenter and participants in a virtual conference room, a hall or other shared space using special video features. The opportune periods of time may correspond to pauses in presenter audio caused by seeking audience feedback. Voice direction and location of the presenter may be adjusted based on relocation of an image of the presenter. In the third mode, audio tracks from the audience microphones may be pre-processed and mixed.

According further to the system described herein, a non-transitory computer readable medium contains software that, when executed, performs the steps set forth above.

The proposed system creates an adaptive audio environment with foreground, background and combined adaptation features for immersive individual conference spaces with shared virtual channels, addressing damaging and productivity stimulating background noise, altering acoustic properties of a presentation space, generating various types of audience feedback, generating semantic and expressive audio markers, creative use of mono and stereo audio, altering presenter's voice direction, location and characteristics, allowing brief reference-based replays of noisy and muffled audio fragments, and providing diarization with untangling cross talk.

Various aspects of system functioning are explained as follows.

Individual conference spaces with shared virtual channels allow three types of video presentations: live, pre-recorded and combined (when a live presentation includes pre-recorded fragments and may also be recorded for the subsequent use). A pre-recorded presentation may be authentic, that is, created as a direct recording of a live or a combined presentation, as it is seen by the audience, or curated (edited and/or synthesized).

For any presentation type, an image of presenter (or of multiple presenters) may be displayed in front of the presentation channel(s), delivering to the audience live speech with articulation, facial expressions and gestures. An image of a presenter may be automatically or manually repositioned or made semi-transparent to ensure an always-visible mode for the channel content. Additionally, the image of the presenter may be altered using color and other visual effects.

Creating adaptive audio streams for presentations from individual conference spaces is aimed at enhancing presentation quality, attractiveness and comprehension. Adaptive features of audio streams may include background, foreground and combined adaptation features explained below.

1. Eliminating background noise (house, family, office, street, industrial, etc.) is one of the basic background adaptation features; a variety of applications, such as Krisp, Denoise, Neutralizer, UrbanDenoiser are available for this purpose.

2. Generating background sounds as a productivity and attention booster. Applications like Noise Generator and myNoise may add variously colored background noise—brown, pink, violet, blue—that may be adapted to various presentation types and modes.

3. Altering acoustic properties of presentation space. Depending on presentation logic and a number of presenters and participants, the system may emulate various presentation spaces, from an individual room or a recording studio to a large conference hall. Acoustic properties of such spaces may be introduced by varying echo and reverberation levels and intensities. This is a combined background/foreground feature that may be altered during a presentation. For example, if new presenters join the panel and open additional channels, the system may emulate an effect of expanding the conference space.

4. Generating audience feedback. Acoustic audience feedback may be fully emulated, synthesized from a background feed, and natural; combinations of the three types of feedback are also possible.

a. Emulated audience feedback may be in the form of pre-recorded or auto-generated laugh, sigh, applaud, happy or angry exclamations, etc., similar sounds provided with soap operas or other entertainment venues.
   b. Synthesized feedback may utilize a special feedback mode. In the present systems, all but one microphone of participants are muted (red) to avoid interruptions. This is not necessarily required, because the system may recognize the microphone of the presenter and leave the muted microphones in a background feedback (yellow) mode, whereby audio tracks from the muted microphones are captured in the background but not broadcasted, except for specially designated time slots (opportune times, delivery windows), such as when the presenter is intentionally pausing the talk seeking for audience feedback, possibly following a predesigned schedule. Audience microphones may be switched into the yellow mode in the anticipation of the presenter's pausing of the talk, so the audience may react to a most recent fragment of the presentation, and the feedback may be collected in the background, pre-processed, mixed and broadcast for a short period of time, normally during the presenter's pause. When in the yellow mode (synonymously, the third mode, counting the first "green" mode corresponding to an audience member's audio broadcast and the second "red" mode corresponding to the muted audio of an audience member), a meeting participant (audience member) may enter a voice command or actuate a control to indicate that the verbal feedback is coming (and similarly stop capturing the audio feedback). Analogously, the presenter may activate the feedback collection mode for the audience, which may be indicated to the audience via audio or video means, so the audience realizes that their microphones are capturing the feedback.
   c. Natural feedback may follow the same routine as the synthesized feedback, except there may be no pre-processing or artificial mixing; the reception mode on microphones of participants may be yellow or green, changing to the red mode after the feedback slot transpires.

Specifics of the emulated audience feedback may be controlled by a combined facial, gesture and speech expression/emotion recognition engine, applied to a visual appearance and an audio stream of the presenter. In particular, the system may recognize and group presenter and user sentiments and generate feedback that drives an overall presentation toward goals of the presentation, such as consent, enthusiasm, understanding of the presented material, creative mood, etc.

Audience feedback may be further acoustically and visually enhanced by changing spatial acoustic properties to a larger conference room or hall (depending on the number of participants), as explained above, and zooming out a scene to show the presenter and all participants in a virtual conference room, a hall or other shared space using special video features, instead of staying within a caged matrix view, which is characteristic for the existing videoconferencing systems.

5. Generating and reproducing semantic and expressive background audio markers. In addition to synthesized background noise (if it is present) and in response to changing expressive and emotional presenter state, the system may generate background audio markers reflecting an emotional state (anger, satisfaction, excitement, happiness, etc.) and accompany each state for a duration of the state, for a short introductory period of time or periodically.

Audio markers may also reflect other events and processes occurring during presentation, such as differentiating between live and pre-recorded presenter's voice, inviting explicit user feedback, changing presentation topic, opening a new channel, emphasizing markup or pointing to channel content, etc. Audio markers may be non-verbal (growling, applauding, etc.) or may include brief verbal expressions.

An emotional state of the presenter may be recognized by the above-mentioned facial/gesture/speech recognition engine or may be explicitly indicated by the presenter by controlling image color or applying other visual effects.

6. Using Mono and stereo audio. The system may alter between mono and stereo audio for various purposes, such as distinguishing between live and pre-recorded portions of a presentation. It may be challenging for video conference participants to tell a pre-recorded fragment of a presentation from a live or a mixed fragment. To underscore a distinction, the system may "flatten" the audio stream of a pre-recorded fragment, playing each pre-recorded fragment as a monophonic sound, while a live portion may utilize a stereophonic sound.

7. Altering voice direction and location. During presentations, presenter(s) image (real-life video, emulated avatar or other entity) may move within the conference space, including zoom-out, zoom-in and relocation of presenter image(s) to point to the content, mark up a presentation, switch to a different virtual of physical channel, such as a whiteboard or a flipchart. Additionally, multiple presenters may move synchronously or independently, form discussion panels with or without visual content, etc. The system may enhance presentation quality by emulating a spatial origin of each speech source and a distance of each speech source from the listeners, including location and direction of each track, following the movement of each presenter along the conference space or across each presentation channel.

8. Altering voice characteristics (pitch, timbre, expression). From a technical standpoint, altering pitch, timbre or expression of speech of a presenter is not difficult. It may follow a change in appearance of the presenter (for example, mimicking a cartoon character chosen by the presenter as a temporary or a permanent avatar) or a recognized or explicitly indicated mood or emotional state. However, keeping the synchronicity of an altered speech stream with both presentation logic, tied to channel content, and a visible articulation and mimic of the face of the presenter may be challenging. It may be more successful with post-processing of a pre-recorded presentation when multiple editing steps and attempts are available and less appropriate for live presentations.

9. Brief replays. Provided that presentations in individual conference spaces are recorded at all times and may be enhanced with speech-to-text conversion, presenter or audience driven replays of short portions of presentations are both possible and beneficial. A presenter may replay a couple phrases if, for example, speech of the presenter was interrupted by a (permitted) natural user feedback; other reasons for replay may include a complex phrase or a distraction by several listeners who signal a replay request using some visual mechanism. Presenter(s) may replay recent portions of their presentations by using a common slider/replay interface or by a verbal reference, using the speech recognition feature.

10. Untangling multi-person speech episodes. If voice recordings from several participants of a multi-user immersive conference overlap (cross talk), the system may isolate each source audio if the audio signals were recorded separately before mixing. If the audio signals were not recorded separately, the system may process the mixed stream to obtain diarization. Subsequently, the system may offer different options of replaying speech of separate participants, sequentially or selectively, on demand.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein offers an adaptive audio environment with foreground, background and combined adaptation features for immersive individual conference spaces with shared virtual channels.

Figure 1:
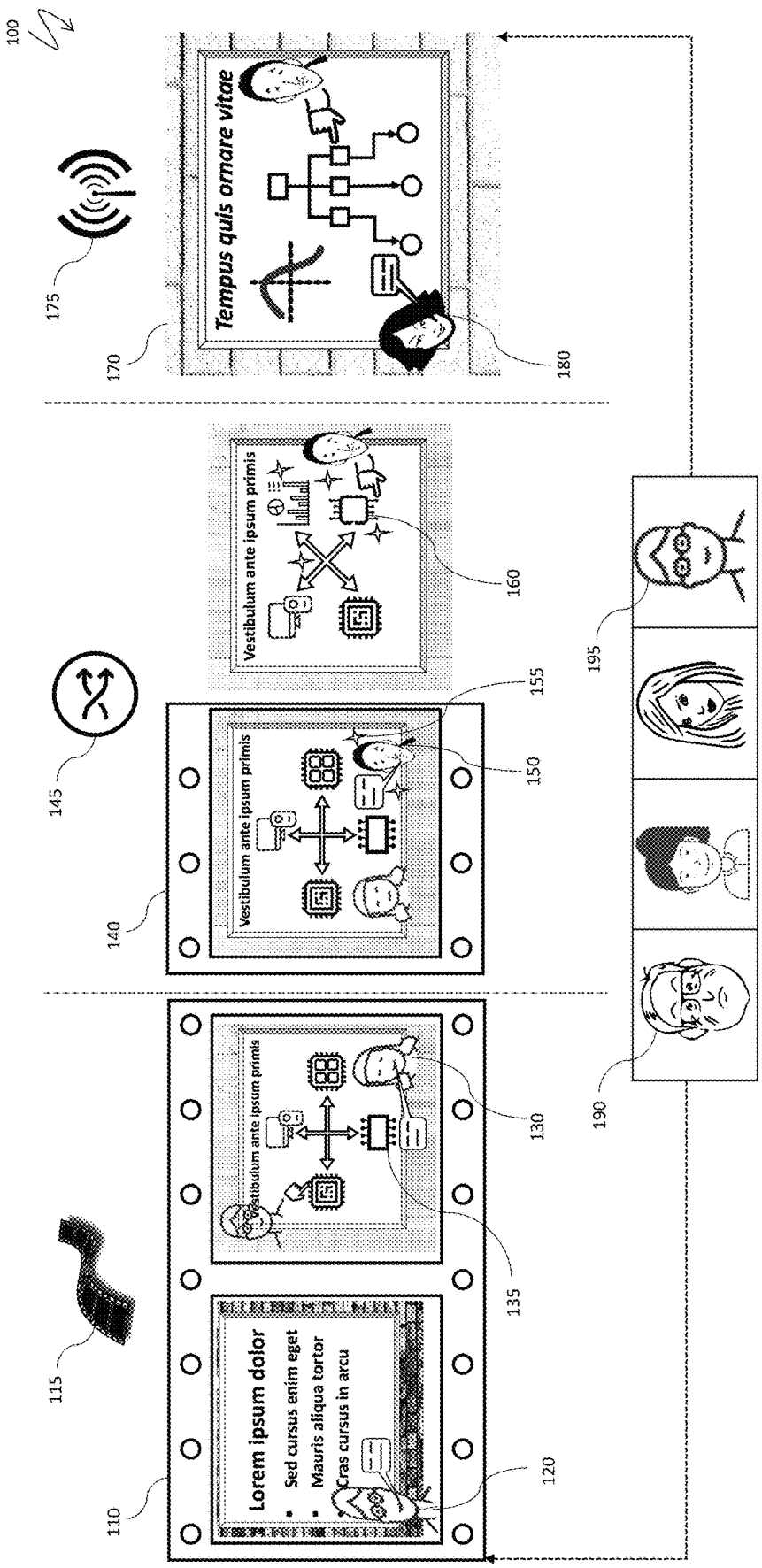
FIG. 1 is a schematic illustration of three types of immersive conferences, according to an embodiment of the system described herein.

FIG. 1 is a schematic illustration 100 of three types of immersive conferences. A first fragment 110 of an immersive video conference illustrates a portion of pre-recorded immersive presentation, as symbolized by a film strip icon 115. The fragment 110 reproduces a past presentation where an original presenter 120 has been joined by a co-presenter 130 in featuring and discussing original presentation content 135. A second fragment 140 is a mixed presentation (symbolized by a mixing symbol 145); in the fragment 140, a live presenter 150 joins a pre-recorded video stream, as highlighted by a plurality of stars 155. The live presenter 150 replaces the original presenter 120, whereas the first co-presenter 130 temporarily stays in the mixed fragment of the immersive video conference. Subsequently, the mixed pre-recorded/live portion evolves into a live presentation, still based on the original presentation content 135, where the live presenter 150 edits past content, as illustrated by a new content item 160. A third fragment 170 of the video conference is a fully live presentation (as indicated by an online symbol 175), where the live presenter 150 is joined by a co-presenter 180.

All three of the video conference fragments 110, 140, 170 are presented to conference participants 190. Note that a participant 195 watching the presentations is in fact the original presenter 120 for the pre-recorded fragment 110.

Figure 2:
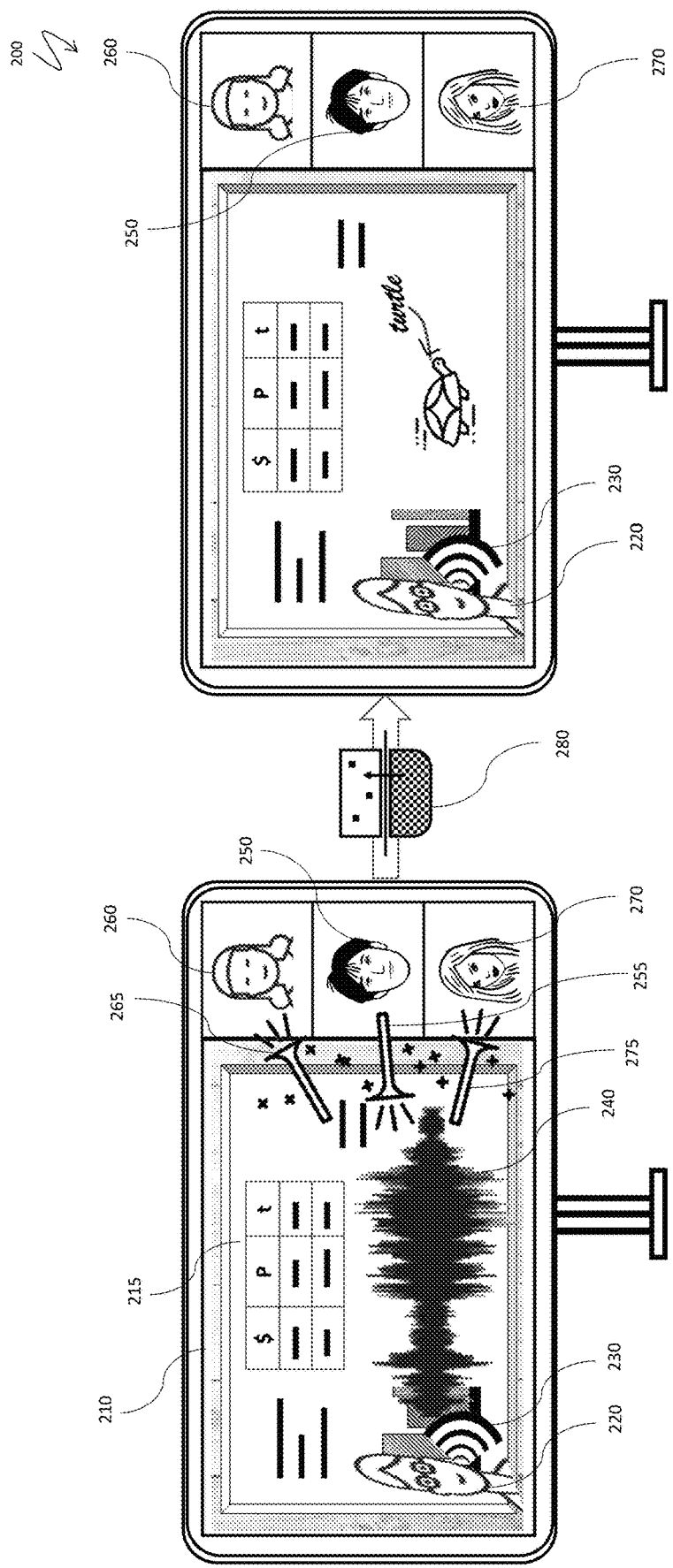
FIG. 2 is a schematic illustration of eliminating background noise, according to an embodiment of the system described herein.

FIG. 2 is a schematic illustration 200 of eliminating the background noise. An immersive video conference 210 with a shared virtual channel 215 is guided by a presenter 220, whose speech 230 is obstructed and illegible, as shown by a distorted voice stream 240. One component of background noise in FIG. 2 comes from individual conference space of a participant 250, as shown by a noise icon 255. Other conference participants 260, 270 are suffering effects of the background noise as shown by items 265, 275. A noise filter 280 is applied to the distorted voice stream 240 and eliminates the background noise, clearing an audio portion of the presentation, as illustrated in a right portion of FIG. 2. Accordingly, all of the meeting participants 250, 260, 270 may hear an unobstructed presentation. Note that noise filter(s) may be applied (not shown in FIG. 2) to an original audio stream of a conference participant 250 (source of the background noise), to the mixed stream broadcasted to conference participants or to both streams.

Figure 3:
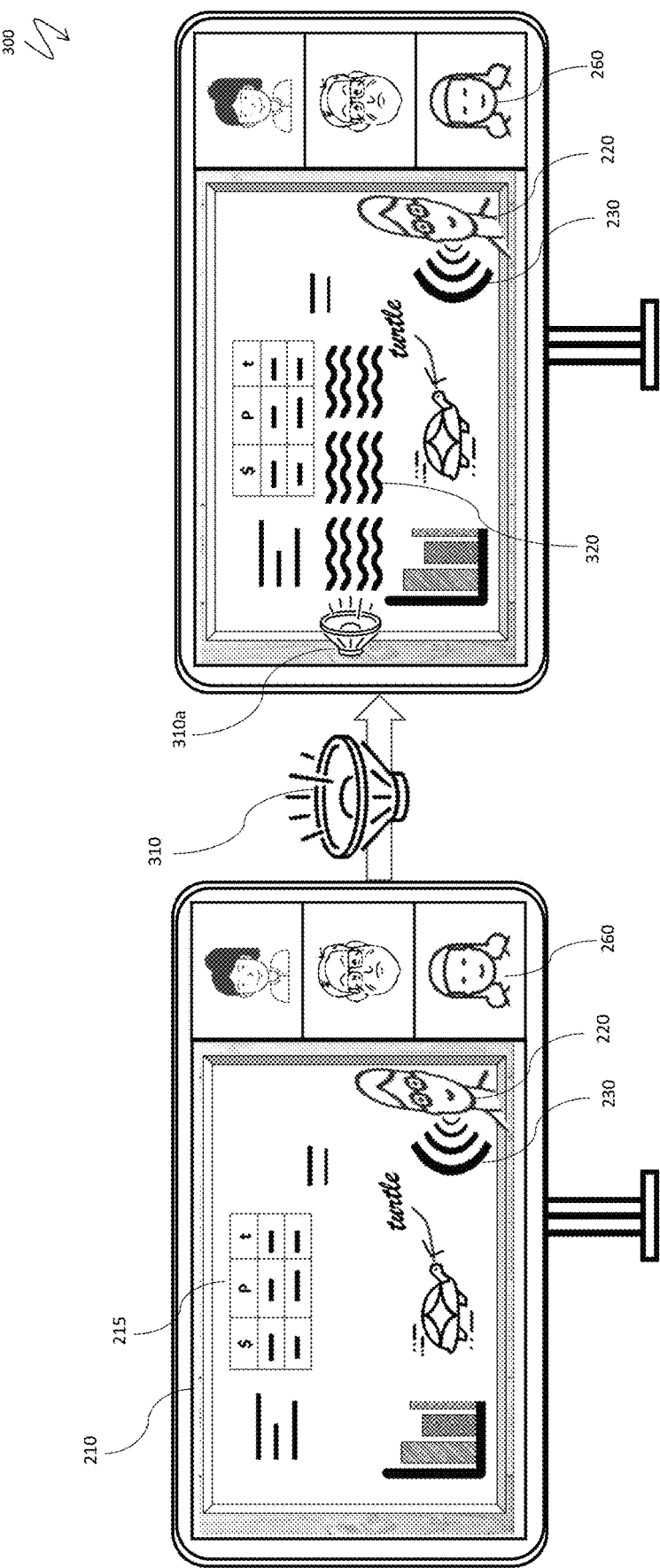
FIG. 3 is a schematic illustration of generation of productivity enhancing background sounds, according to an embodiment of the system described herein.

FIG. 3 is a schematic illustration 300 of generation of productivity enhancing background sounds. The immersive video conference 210 with the shared virtual channel 215 is driven by the presenter 220, whose speech 230 is heard by participants 260. Based on the audience reaction, presentation specifics and other factors, a background sound generation component 310 may determine parameters and color of a productivity enhancing background noise and a generator 310*a* may add background noise 320 to an acoustic environment of the video conference, that is heard by the speaker 220 and the conference participants 260.

Figure 4:
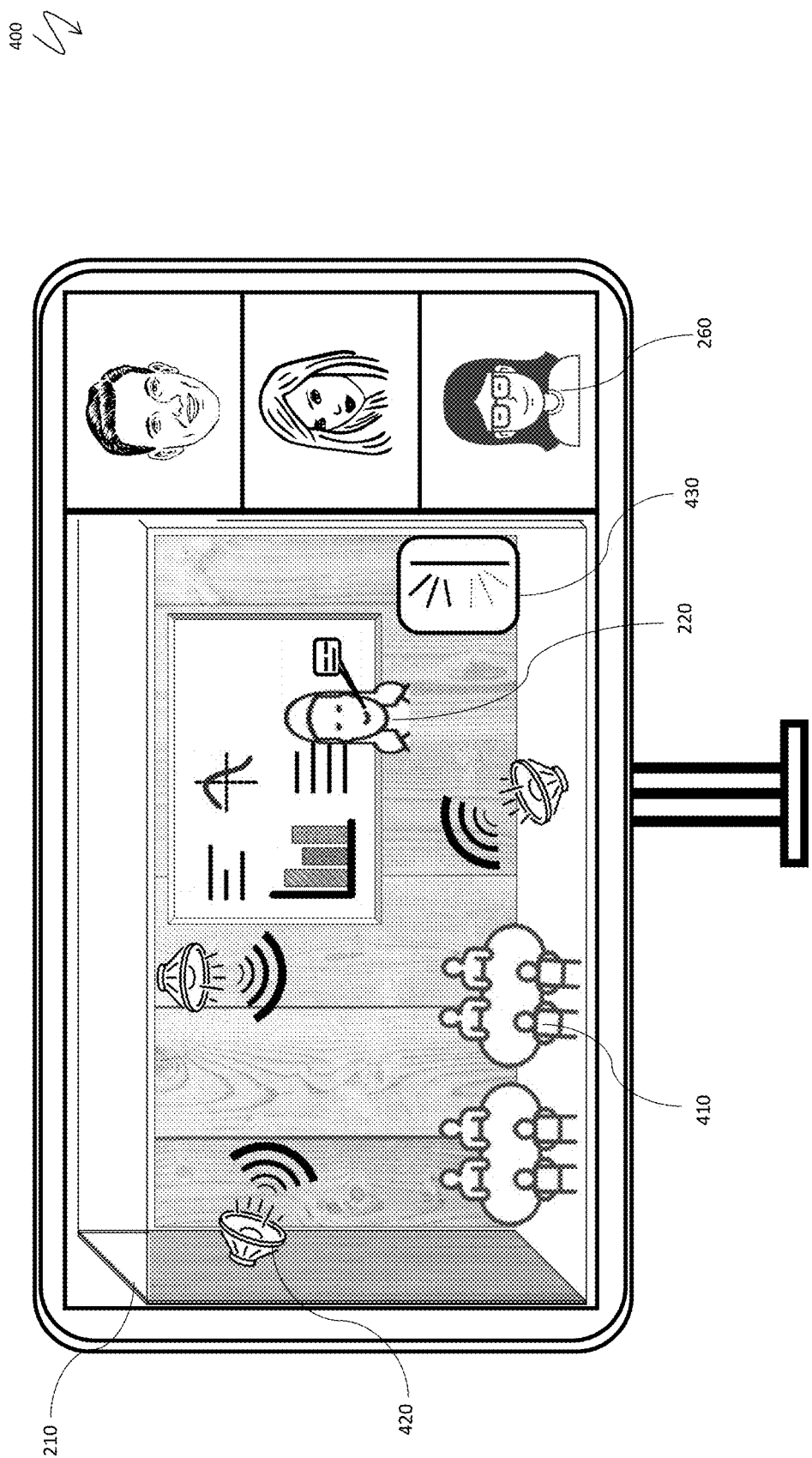
FIG. 4 is a schematic illustration of altering acoustic properties of a presentation space, according to an embodiment of the system described herein.

FIG. 4 is a schematic illustration 400 of altering acoustic properties of a presentation space. The immersive video conference 210 may be associated with an individual environment of the presenter 220 and follow acoustic properties of a room where the presenter 220 is residing during the video conference 210. However, for the purpose of the conference, the immersive video conference 210 may be virtually expanded and emulate a larger conference hall with many more immersive participants (not necessarily presenters), as illustrated by conference tables with participants 410. In order to sound natural for participants 260 of the video conference, acoustic properties of such expanded environment should be different from the small individual conference space of the presenter 220, which may be achieved by an addition of secondary audio reproduction sources 420 generating echo, emulators of reverberating surfaces 430, etc. This is a combined foreground/background feature and applies both to voice of the presenter(s) and to all types of background noise.

Figure 5:
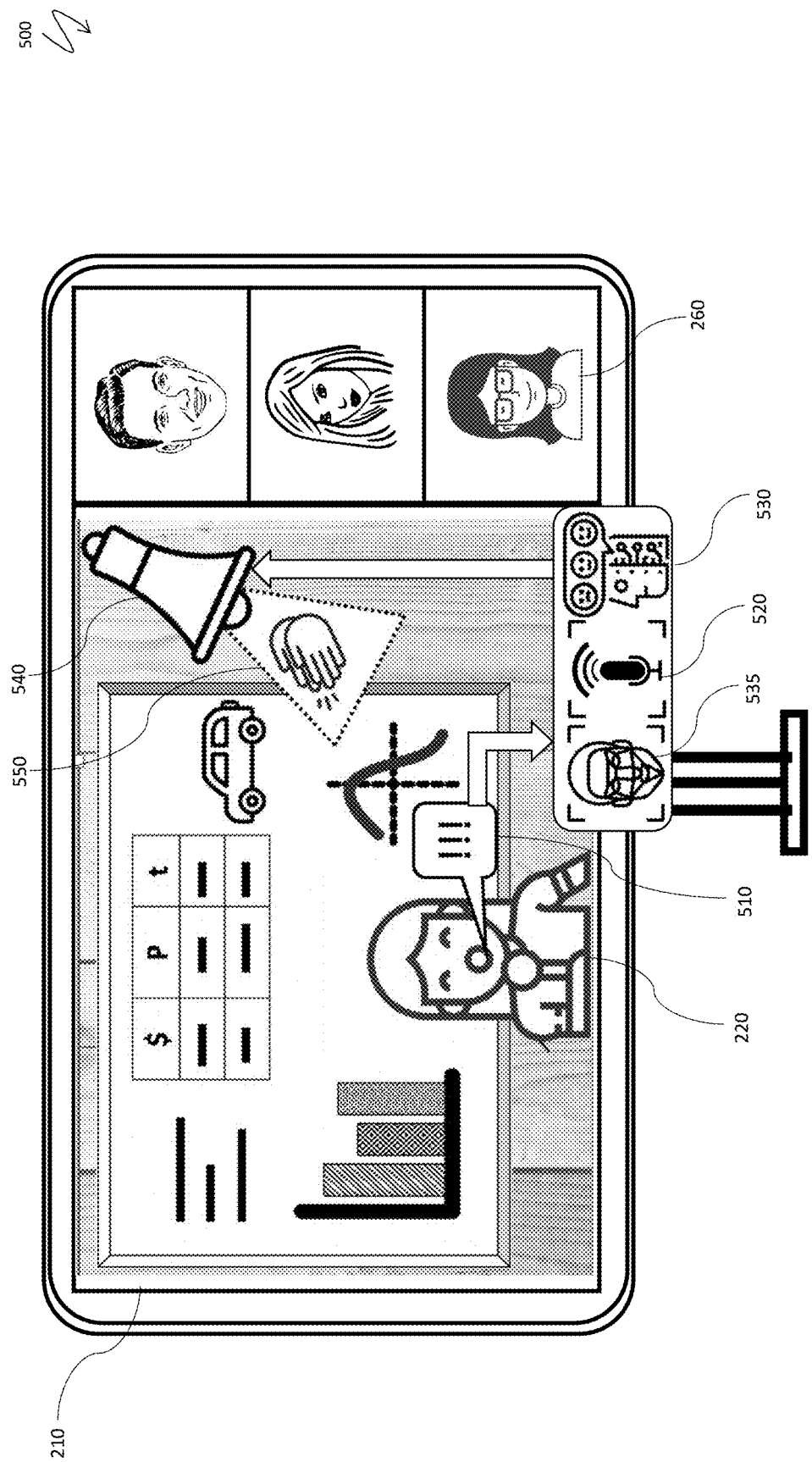
FIG. 5 is a schematic illustration of emulating audience feedback, according to an embodiment of the system described herein.

FIG. 5 is a schematic illustration 500 of emulating audience feedback. The presenter 220 is speaking in the immersive video conference 210 before the conference participants 260. A speech 510 of the presenter 220 is processed by a speech recognition component 520 and a sentiment recognition component 530, and emotions of the presenter 220 are also analyzed using a facial recognition component 535, which may identify appropriate moments for audience feedback and a desired type of feedback. Instructions are delivered to an audience feedback generator 540, which emulates and replays the relevant audience reaction, such as applause, without direct involvement of meeting participants.

Figure 6:
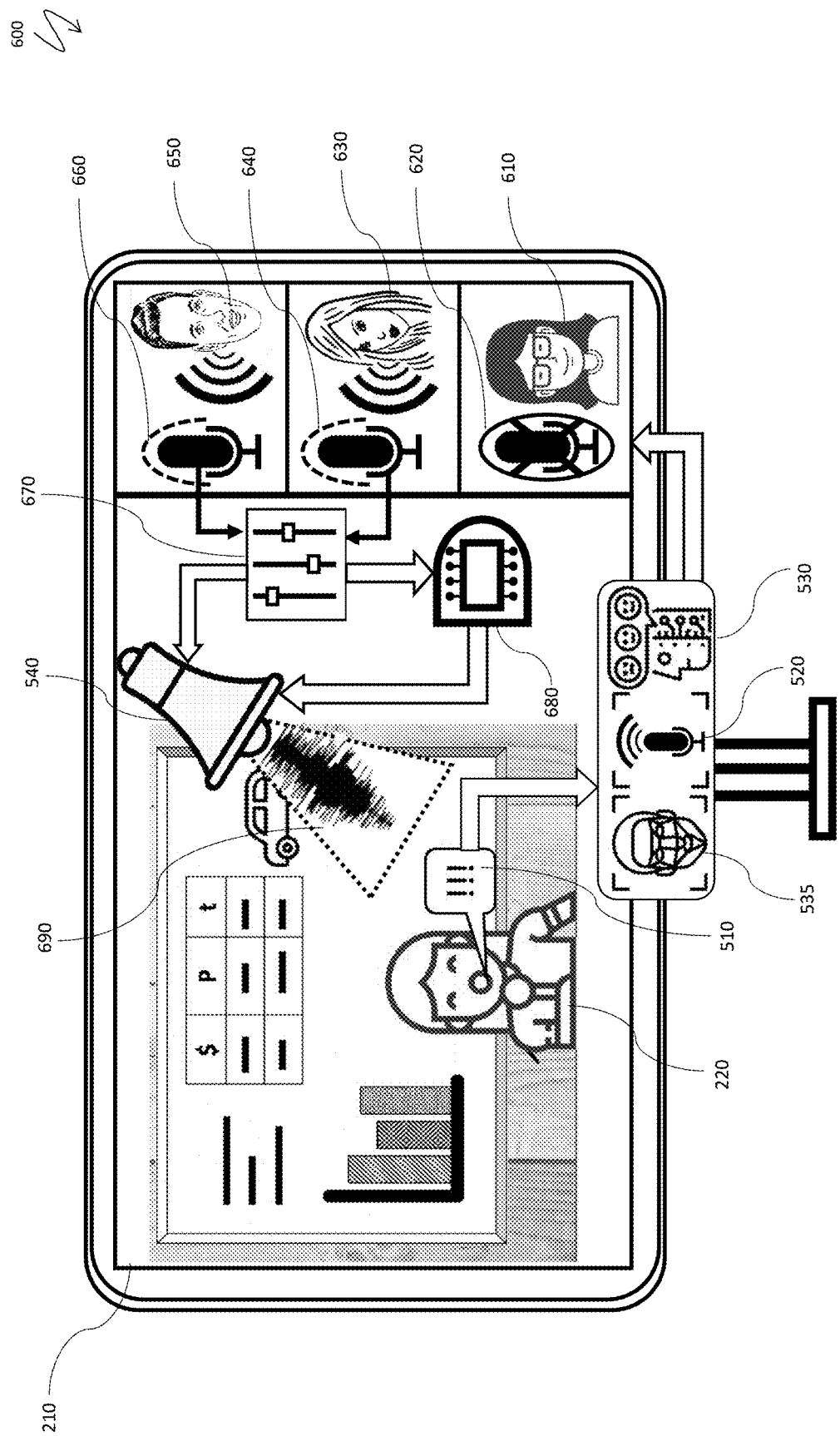
FIG. 6 is a schematic illustration of providing live and pre-processed audience feedback, according to an embodiment of the system described herein.

FIG. 6 is a schematic illustration 600 of providing live and pre-processed audience feedback. The presenter 220 speaks in the immersive video conference 210 before conference participants 610, 630, 650 and the speech 510 of the presenter 220 is processed by the speech recognition component 520 and the sentiment recognition component 530, while emotions of the presenter 220 are also analyzed using the facial recognition component 535; appropriate moments for audience feedback and a desired type of feedback are determined. In contrast with FIG. 5, the system allows live feedback by the participants 610, 630, 650, which may be synchronous or pre-recorded (asynchronous). The participants 610, 630, 650 are allowed to provide audio feedback at any time; however, the feedback may not be instantly mixed into an audio stream of the conference. Mixing the feedback may occur only at the opportune moments (delivery windows), as explained elsewhere herein. Participant feedback outside the delivery windows may be recorded and stored. In FIG. 6, the participant 610 has her microphone 620 muted, while the users 630, 650 may be providing live feedback through unblocked microphones 640, 660; alternatively, previously recorded feedback from the users 610, 630, 650 may be utilized. Live feedback is appropriately mixed by a sound mixing component 670 and immediately transmitted to the feedback generator 540, described above. Recorded asynchronous feedback may be first directed to a processing component 680, which may select audio clips of the recorded feedback satisfying a desired feedback type, as detected by the speech recognition component 520 and the sentiment recognition component 530, which are then transferred to the feedback generator 540. A final version of audio feedback 690 for the specified delivery window is added to the audio stream of the conference.

Figure 7:
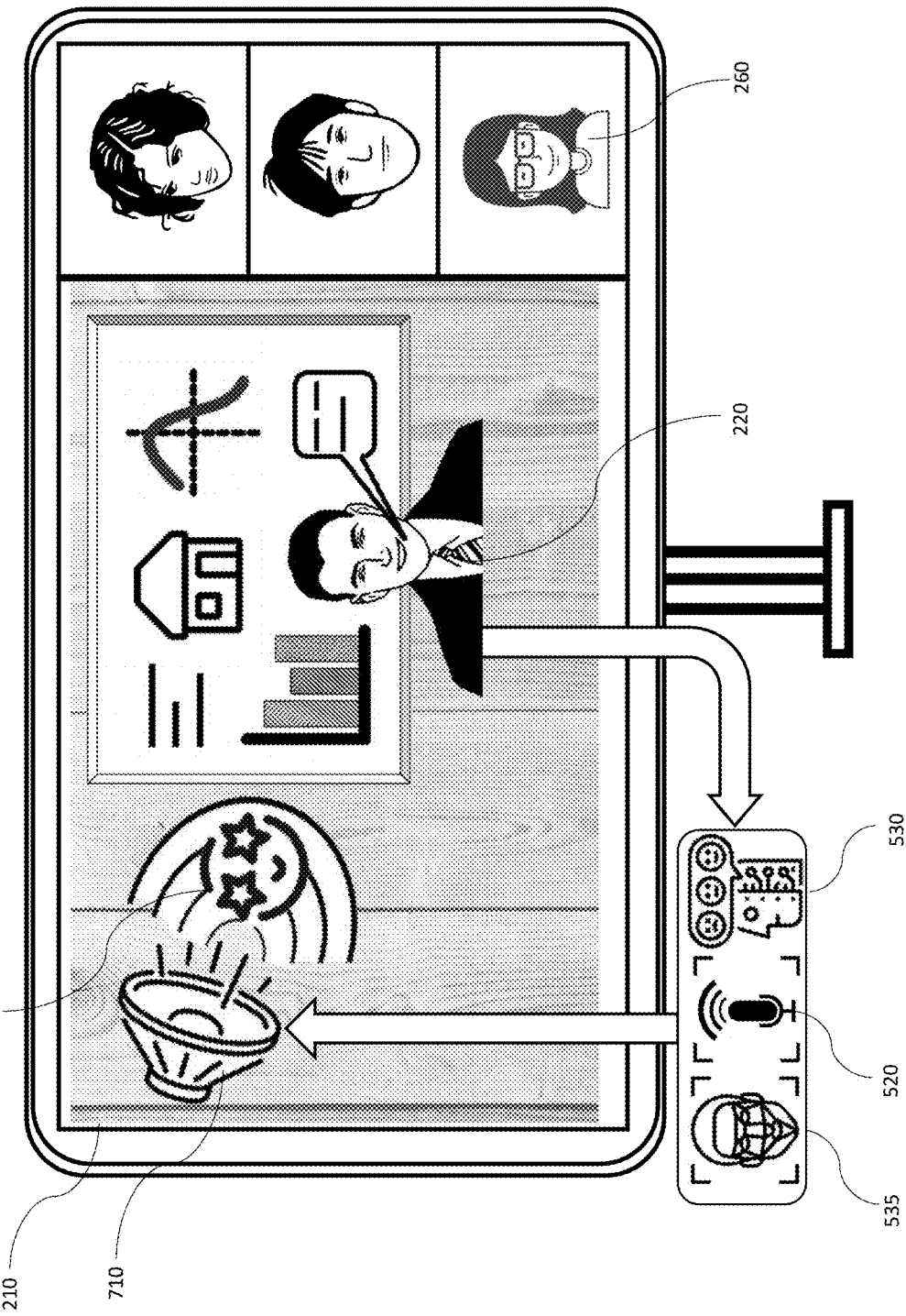
FIG. 7 is a schematic illustration of generating audio markers, according to an embodiment of the system described herein.

FIG. 7 is a schematic illustration 700 of generating audio markers. The system may use a combination of the facial recognition component 535, the speech recognition component 520, and the sentiment recognition component 530 to identify portions of talk of the presenter 220 speaking in the immersive video conference 210 before conference participants 260 that could be emphasized for the audience by adding audio markers, such as brief tunes or exclamations expressing emotions, signifying success, questions, etc. When such portions of the talk of the presenter 220 are identified, the sentiment recognition component 530 activates an audio marker generation system 710, which retrieves and replays for the audience (the speaker 220 and conference participants 260) an appropriate audio marker 720.

Figure 8:
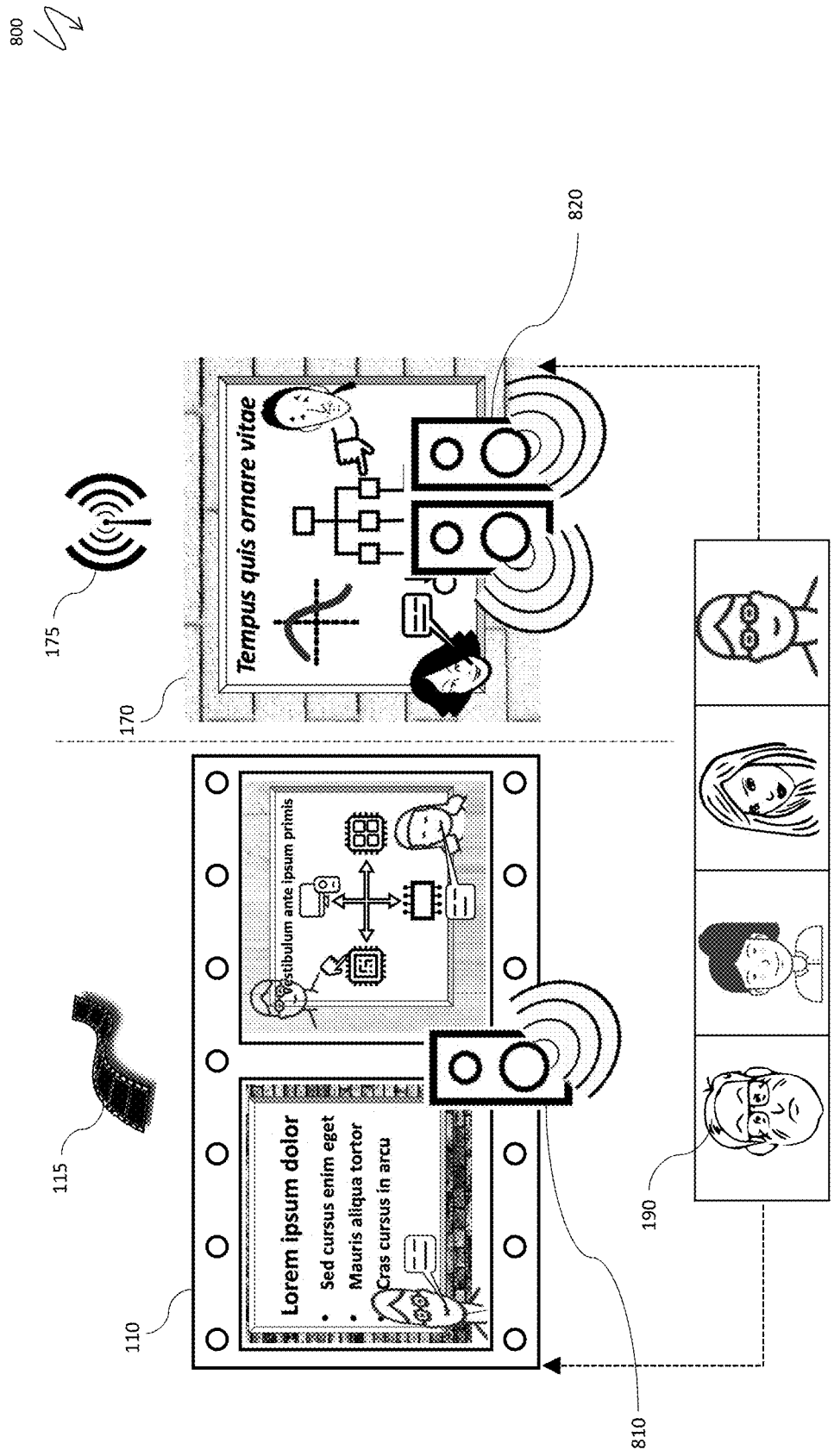
FIG. 8 is a schematic illustration of employing mono and stereo sound as identifiers of conference fragment types, according to an embodiment of the system described herein.

FIG. 8 is a schematic illustration 800 of employing mono and stereo sound as identifiers of conference fragment types. Using notations of FIG. 1, FIG. 8 shows the conference participants 190 watching the pre-recorded fragment 110 (the symbolic film strip 115) of a video conference, followed by the live fragment 170 (the real-time presentation symbol 175). It may not be immediately obvious for the conference participants 190 which fragment is pre-recorded and which is live, so the system may play different audio modes to facilitate differentiation between the fragments 110, 170. Thus, a pre-recorded fragment of the conference may be replayed in a monophonic sound 810, while a live fragment may feature a stereophonic sound 820.

Figure 9:
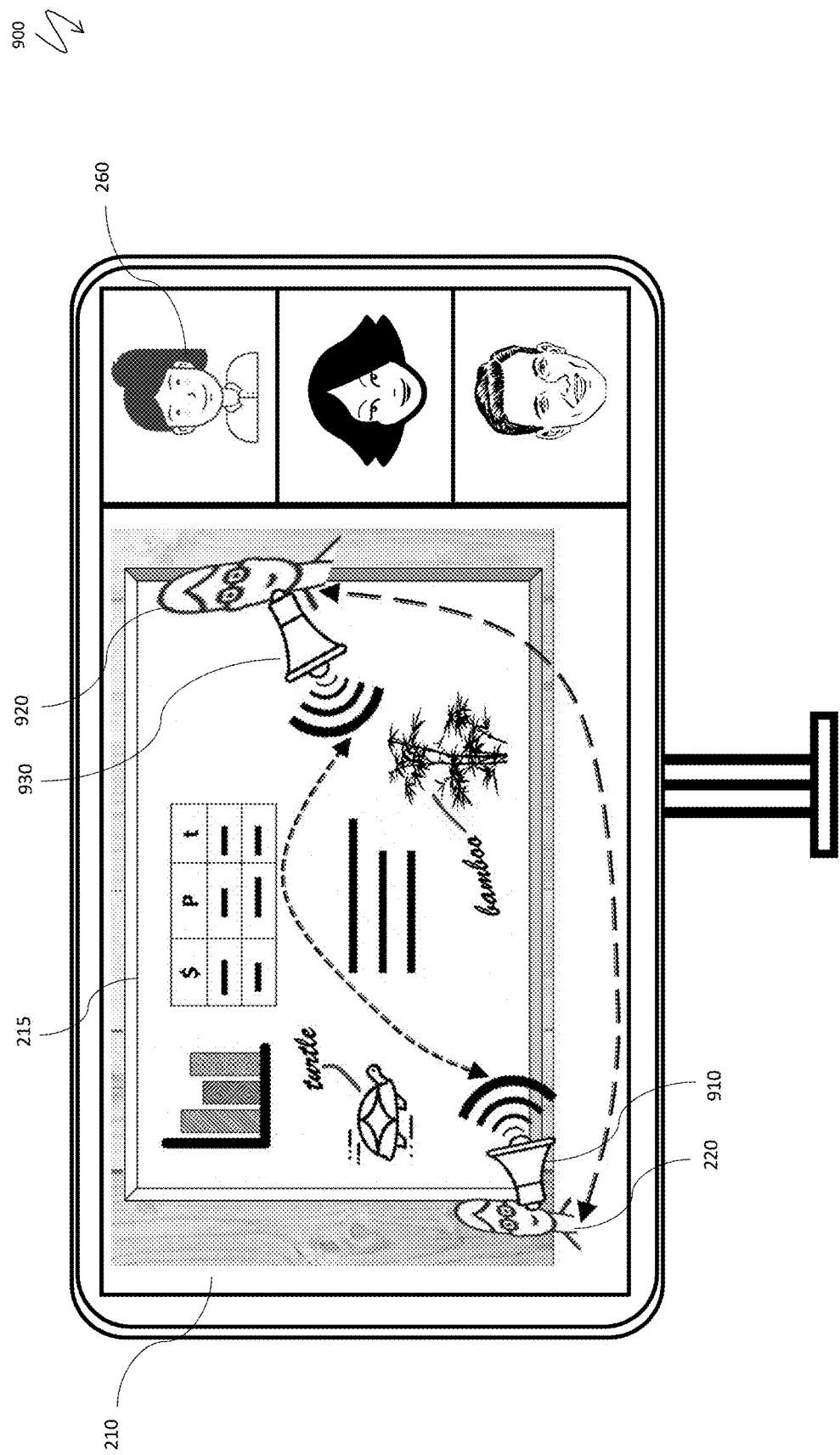
FIG. 9 is a schematic illustration of acoustic following of presenter movements with voice direction and location, according to an embodiment of the system described herein.

FIG. 9 is a schematic illustration 900 of acoustic following of presenter movements with voice direction and location. The presenter 220 talking during a video conference from the immersive video conference 210 may change position, including moving across the shared virtual channel 215, potentially changing image size, color and transparency to highlight and emphasize certain portions of the presentation content displayed in the channel 215, as demonstrated in FIG. 9 by an alternative presenter position 920. This is described in U.S. patent application Ser. No. 17/323,137 titled: "INDIVIDUAL VIDEO CONFERENCING SPACES WITH SHARED VIRTUAL CHANNELS AND IMMERSIVE USERS", filed on May 18, 2021 by Phil Libin, which is incorporated by reference herein. Accordingly, the system may emulate the change of an original location and direction of a source of a voice 910 of the presenter 220 to a new location and direction 930, creating a more realistic adaptive audio arrangement for participants 260 of the video conference.

Figure 10:
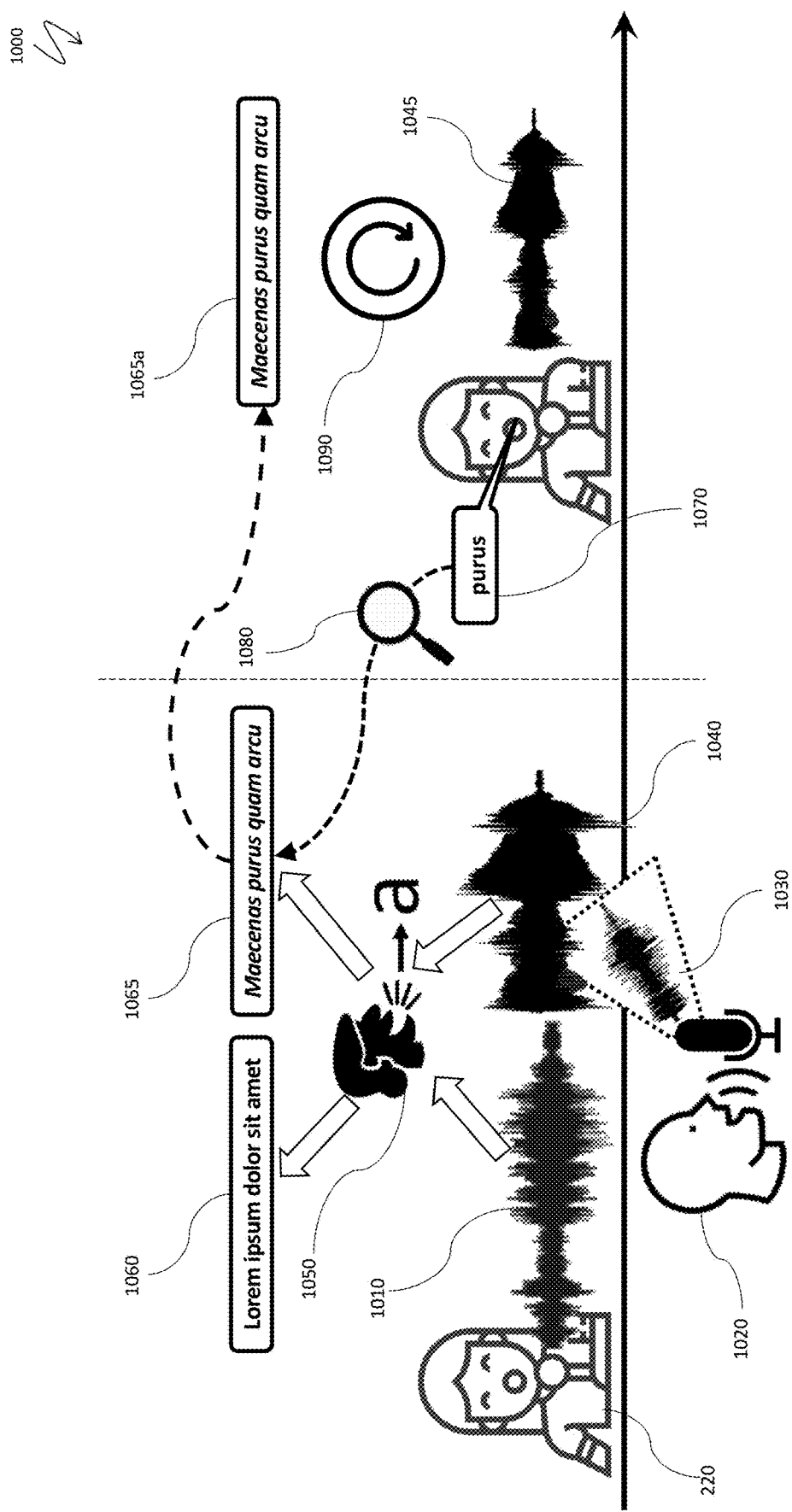
FIG. 10 is a schematic illustration of storing audio fragments of an immersive presentation and replaying the audio fragments by references, according to embodiments of the system described herein.

FIG. 10 is a schematic illustration of storing audio fragments of an immersive presentation and replaying the audio fragments by references. FIG. 10 shows two segments of talk of the presenter 220: the first segment 1010 is unobstructed, while in the middle of a second segment 1040 a participant 1020 interferes with the presenter 220 and portion of the second segment 1040 is a mix of a talk 1045 of the presenter 220 and a replica 1030 of the participant 1020; therefore, some other participants of a video conference may not have been able to hear the segment 1045 clearly enough and the segment 1045 may require a replay. Two features of the immersive presentation are making an instant replay possible: recording the presenter 220 and voice recognition.

A speech-to-text (voice recognition) component 1050 may be continuously applied to an audio stream of the presenter 220 and may record presentation text simultaneously with an audio portion of the audio stream. Accordingly, for both of the segments 1010, 1040, corresponding text portions 1060, 1065 are recorded by the system. At the end of the segment 1040, the presenter 220 may retrieve the segment 1040 via a voice-based keyword search 1070, 1080 to obtain a corresponding copy 1065a of the second segment 1040 and initiate replay 1090 of the talk 1045 of the presenter 220 in the second segment 1040. Note that the system may replay not only audio segments but also complete audio-video fragments of presentations.

Figure 11:
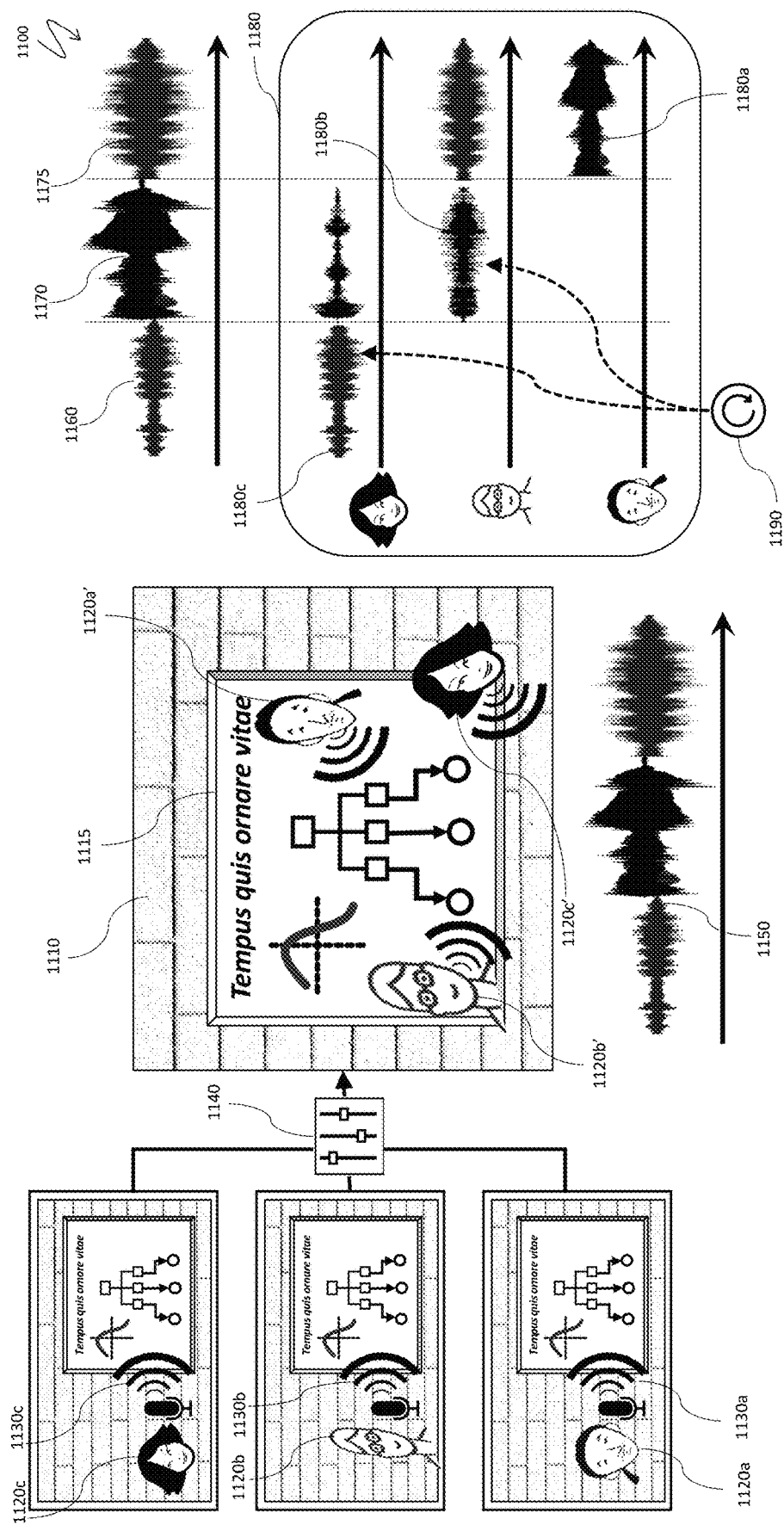
FIG. 11 is a schematic illustration of untangling overlapping multi-person speech fragments, according to an embodiment of the system described herein.

FIG. 11 is a schematic illustration 1100 of untangling overlapping multi-person speech fragments. An immersive presentation space 1110 with a shared virtual channel 1115 is hosting a video conference where a presenter 1120a and two co-presenters 1120b, 1120c talk from individual conference spaces, from a shared physical conference space or from a combination of individual and shared conference spaces. For other participants of the video conference (not shown in FIG. 11), the presenter 1120a and the co-presenters 1120b, 1120c are sharing the same immersive presentation space and images 1120a', 1120b', 1120c' of the presenter 1120a and the co-presenters 1120b, 1120c may appear at different locations of the shared presentation space, as explained elsewhere herein (see, for example, FIG. 9 and the accompanying text). Audio streams 1130a, 1130b, 1130c of the presenter 1120a and the co-presenters 1120b, 1120c are mixed by the system component 140 and form a combined audio stream 1150 of the video conference. In FIG. 11, the combined audio stream 1150 includes three segments: an individual unobstructed talk segment 1160 of the co-presenter 1120c and two double-talk segments 1170, 1175; in the first double-talk segment 1170, the co-presenters 1120b, 1120c are talking simultaneously; in the second segment 1175, the co-presenter 1120b and the presenter 1120a are talking at the same time.

The system builds a speaker channel pane 1180 where all individual talk segments of each speaker are untangled and ready for the replay 1190 on demand—in this case, a first segment 1180c of the co-presenter 1120c and a second segment 1180b of the co-presenter 1120b are replayed (or scheduled for replay) by another participant or one of the speakers, while a segment 1180a by the presenter 1120a is not referred for the replay. In case when all the audio streams 1130a, 1130b, 1130c are captured independently (see FIG. 10 for more information), arrangement of the audio streams 1130a, 1130b, 1130c in the speaker channel pane is straightforward; otherwise, separating an overlapping audio stream may require diarization. Note that the replay component 1190 may be using a voice-based keyword search (not shown in FIG. 11), which is explained in conjunction with FIG. 10.

Figure 12:
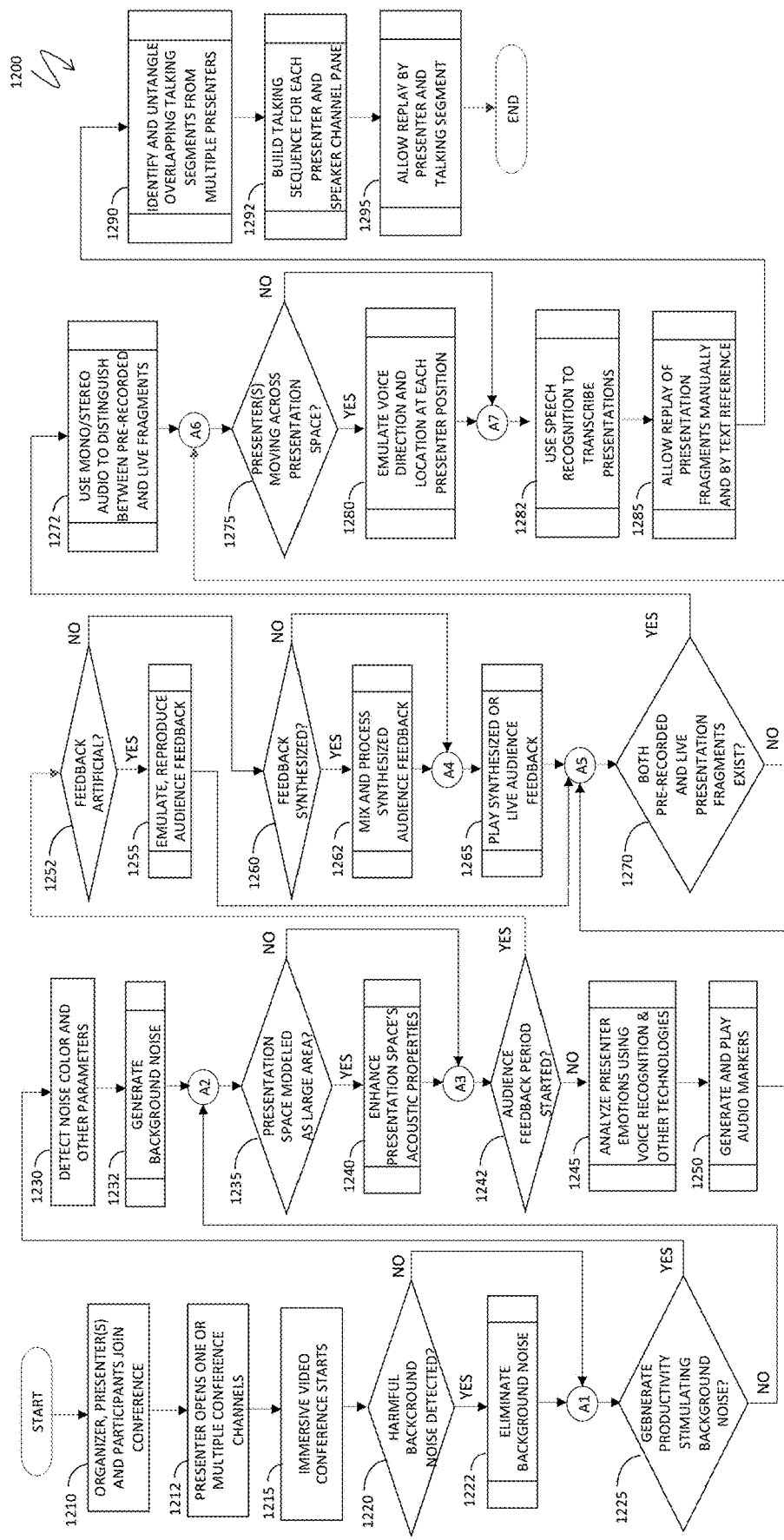
FIG. 12 is a system flow diagram illustrating system functioning in connection with adaptive audio environment for immersive individual conference spaces, according to an embodiment of the system described herein.

Referring to FIG. 12, a system flow diagram 1200 illustrates system functioning in connection with adaptive audio environment for immersive individual conference spaces. Processing begins at a step 1210, where an organizer, presenter(s) and participants join the video conference. After the step 1210, processing proceeds to a step 1212, where the presenter opens one or multiple conference channels, as explained elsewhere herein. After the step 1212, processing proceeds to a step 1215, where the immersive video conference starts. After the step 1215, processing proceeds to a test step 1220, where it is determined whether a harmful background noise is detected. If so, processing proceeds to a step 1222, where the background noise is eliminated, as explained elsewhere herein (see, for example, FIG. 2 and the accompanying text). After the step 1222, processing proceeds to a test step 1225, where it is determined whether a productivity stimulating background noise should be generated (see FIG. 3; note that the test step 1225 may be independently reached from the test step 1220 if it was determined that a harmful background noise was not detected). If so, processing proceeds to a step 1230, where the system identifies a desired noise color and other parameters, as explained in conjunction with FIG. 3. After the step 1230, processing proceeds to a step 1232, where the productivity stimulating background noise is generated.

After the step 1232, processing proceeds to a test step 1235, where it is determined whether the presentation space is modeled as a large area, such as a conference hall. (Note that the test step 1235 may be independently reached from the test step 1225 if it was determined that there was no immediate need to generate a productivity stimulating background noise.) If so, processing proceeds to a step 1240, where the acoustic properties of the presentation space are enhanced (see FIG. 4 and the accompanying text for details). After the step 1240, processing proceeds to a test step 1242 (which may be independently reached from the test step 1235 if it was determined that the presentation space does not represent a large area), where it is determined whether the audience feedback period (slot) has started, as explained elsewhere herein (see, for example, FIGS. 5, 6 and the accompanying text). If not, processing proceeds to a step 1245, where a presenter (and possibly co-presenter(s)) emotions are analyzed using a combination of voice, sentiment and facial recognition technologies (and possibly other technologies, such as gesture and posture recognition, gaze detection and analysis, etc.). After the step 1245, processing proceeds to a step 1250, where the system may generate and play audio markers, as explained in conjunction with FIG. 7. After the step 1250, processing proceeds to a test step 1270, where it is determined whether both pre-recorded and live presentation fragments exist within the current video conference. If so, processing proceeds to a step 1272, where different audio types, such as mono and stereo audio, are used to distinguish between pre-recorded and live fragments (see FIG. 8 for additional information). After the step 1272, processing proceeds to a test step 1275, where it is determined whether a presenter (or one or more of the co-presenters) are moving across the presentation space. If so, processing proceeds to a step 1280, where the system emulates voice direction and audio source location at each new presenter or co-presenter position, as explained elsewhere herein (see, for example, FIG. 9 and the accompanying text).

After the step 1280, processing proceeds to a step 1282, where speech recognition is used to transcribe to text the talk of the presenter (and co-presenters, if applicable). After the step 1282, processing proceeds to a step 1285, where the system allow replaying presentation fragments and talk segments manually and/or by text reference and voice search, as explained in conjunction with FIG. 10. After the step 1285, processing proceeds to a step 1290, where overlapping talking segments from multiple presenters are identified and untangled, as explained elsewhere herein (see FIG. 11 and the accompanying text). After the step 1290, processing proceeds to a step 1292, where the speaker channel pane, containing a talking sequence for each presenter and co-presenter, is built. After the step 1292, processing proceeds to a step 1295, where the system allows replay by presenter and talking segment. After the step 1295, processing is complete.

If it is determined at the test step 1275 that neither the presenter nor the co-presenters are moving across the presentation space, processing proceeds to the step 1282, which may be independently reached from the step 1280. If it is determined at the test step 1270 that pre-recorded and live presentation fragments do not coexist in the current video conference, processing proceeds to the test step 1275, which may be independently reached from the step 1272. If it is determined at the test step 1242 that the audience feedback period (slot) has started, processing proceeds to a test step 1252, where it is determined whether the audience feedback is artificial (emulated). If so, processing proceeds to a step 1255, where the system emulates and reproduces audience feedback, as explained in FIG. 5 and the accompanying text. After the step 1255, processing proceeds to the test step 1270, which may be independently reached from the step 1250. If it is determined at the test step 1252 that the feedback is not artificial, processing proceeds to a test step 1260, where it is determined whether the audience feedback is synthesized from the previously recorded and instant (live) audience reaction to the presentation. If so, processing proceeds to a step 1262, where the system mixes and processes synthesized audience feedback, as explained in conjunction with FIG. 6. After the step 1262, processing proceeds to a step 1265, where the system replays synthesized or live audience feedback. After the step 1265, processing proceeds to the test step 1270, which may be independently reached from the step 1250. If it is determined at the test step 1260 that the feedback is not synthesized, processing proceeds to the step 1265, which may be independently reached from the step 1262.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets and other mobile computers. Smartphones and tablets may use operating system(s) selected from the group consisting of: iOS, Android OS, Windows Phone OS, Blackberry OS and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of adapting an audio portion of a video conference, comprising:
    a presenter providing content for the video conference by delivering live content, prerecorded content, or combining live content with prerecorded content;
    at least one additional co-presenter provides content for the video conference;
    untangling overlapping audio streams of the presenter and the co-presenter by at least one of: replaying individual audio streams from the presenter and the at least one co-presenter or separating the audio streams by diarization;
    recording the presenter to provide a recorded audio stream;
    using speech-to-text conversion to convert the recorded audio stream to text;
    correlating the text to the recorded audio stream;
    retrieving a past portion of the recorded audio stream using a keyword search of the text; and
    replaying the past portion of the recorded audio stream.

2. A method, according to claim 1, wherein a corresponding video stream is replayed along with the past portion of the audio stream.

3. A method, according to claim 1, wherein the keyword is entered using a voice recognition system.

4. A method of adapting an audio portion of a video conference, comprising:
    a presenter providing content for the video conference by delivering live content, prerecorded content, or combining live content with prerecorded content;
    at least one additional co-presenter provides content for the video conference;
    untangling overlapping audio streams of the presenter and the co-presenter by at least one of: replaying individual audio streams from the presenter and the at least one co-presenter or separating the audio streams by diarization;
    eliminating background noise by applying filters thereto; and
    generating background sounds as a productivity and attention booster.

5. A method, according to claim 4, wherein background sounds are based on at least one of: audience reaction and presentation specifics.

6. A method, according to claim 5, wherein audience feedback is acoustically and visually enhanced by changing spatial acoustic properties to emulate acoustic properties of a larger conference room or hall and by zooming out a scene to show the presenter and participants in a virtual conference room, a hall or other shared space using special video features.

7. A method of adapting an audio portion of a video conference, comprising:
    a presenter providing content for the video conference by delivering live content, prerecorded content, or combining live content with prerecorded content;
    at least one additional co-presenter provides content for the video conference;
    untangling overlapping audio streams of the presenter and the co-presenter by at least one of: replaying individual audio streams from the presenter and the at least one co-presenter or separating the audio streams by diarization; and
    emulating audience feedback, wherein emulating audience feedback includes providing sounds corresponding to at least one of: a laugh, a sigh, applause, happy exclamations, or angry exclamations.

8. A method, according to claim 7, wherein emulated audience feedback is controlled by at least one of: a facial recognition component, a gesture recognition component, a speech recognition component, and an expression/emotion recognition component and wherein the recognition components are applied to a visual appearance and an audio stream of the presenter.

9. A method of adapting an audio portion of a video conference, comprising:
a presenter providing content for the video conference by delivering live content, prerecorded content, or combining live content with prerecorded content;
at least one additional co-presenter provides content for the video conference;
untangling overlapping audio streams of the presenter and the co-presenter by at least one of: replaying individual audio streams from the presenter and the at least one co-presenter or separating the audio streams by diarization; and further comprising at least one of:
altering acoustic properties of the audio portion according to at least one of: a number of participants in the video conference and characteristics of a presentation space being emulated for the video conference; or
altering at least one of: pitch, timbre, and expression of at least one of the audio streams provided by the presenter and the co-presenter.

10. A method, according to claim 9, wherein altering acoustic properties includes varying echo and reverberation levels and intensities.

11. A method of adapting an audio portion of a video conference, comprising:
a presenter providing content for the video conference by delivering live content, prerecorded content, or combining live content with prerecorded content; and
actuating audience microphones to select one of three modes: a first mode where sound from a corresponding audience member is broadcast in real time to all participants of the video conference, a second mode where each of the audience microphones is muted, and a third mode where audio tracks from the audience microphones are captured and broadcast at opportune periods of time, wherein the method further includes at least one of the following features:
the audio tracks are not broadcast to participants of the video conference while the audio tracks are being captured;
when the audience microphones are in the third mode, the audio tracks are captured at a particular one of the audience microphones in response to a corresponding one of the audience members providing a verbal command or actuating a control;
when the audience microphones are in the third mode, the audio tracks are captured at a particular one of the audience microphones in response to the presenter providing a verbal command or actuating a control;
captured, pre-processed, mixed and broadcast audio tracks from the audience microphones represent audience feedback;
the opportune periods of time correspond to pauses in presenter audio caused by seeking audience feedback;
voice direction and location of the presenter is adjusted based on relocation of an image of the presenter; or
in the third mode, audio tracks from the audience microphones are pre-processed and mixed.

12. A method, according to claim 11, wherein audience feedback is acoustically and visually enhanced by changing spatial acoustic properties to emulate acoustic properties of a larger conference room or hall and by zooming out a scene to show the presenter and participants in a virtual conference room, a hall or other shared space using special video features.

* * * * *